April 22, 1958   E. PROCOPIO   2,831,526
METHOD AND APPARATUS FOR PRODUCING LAMINATED
SHEETING FROM A CALENDERED SHEET
Filed Jan. 29, 1957   5 Sheets-Sheet 1

INVENTOR
*Edward Procopio*
BY
ATTORNEYS

April 22, 1958 E. PROCOPIO 2,831,526
METHOD AND APPARATUS FOR PRODUCING LAMINATED
SHEETING FROM A CALENDERED SHEET
Filed Jan. 29, 1957 5 Sheets-Sheet 2

INVENTOR
*Edward Procopio*

BY *Burns, Doane, Benedict & Irons*
ATTORNEYS

April 22, 1958 E. PROCOPIO 2,831,526
METHOD AND APPARATUS FOR PRODUCING LAMINATED
SHEETING FROM A CALENDERED SHEET
Filed Jan. 29, 1957 5 Sheets-Sheet 3

INVENTOR
*Edward Procopio*

BY
*Burns, Doane, Benedict & Crone*
ATTORNEYS

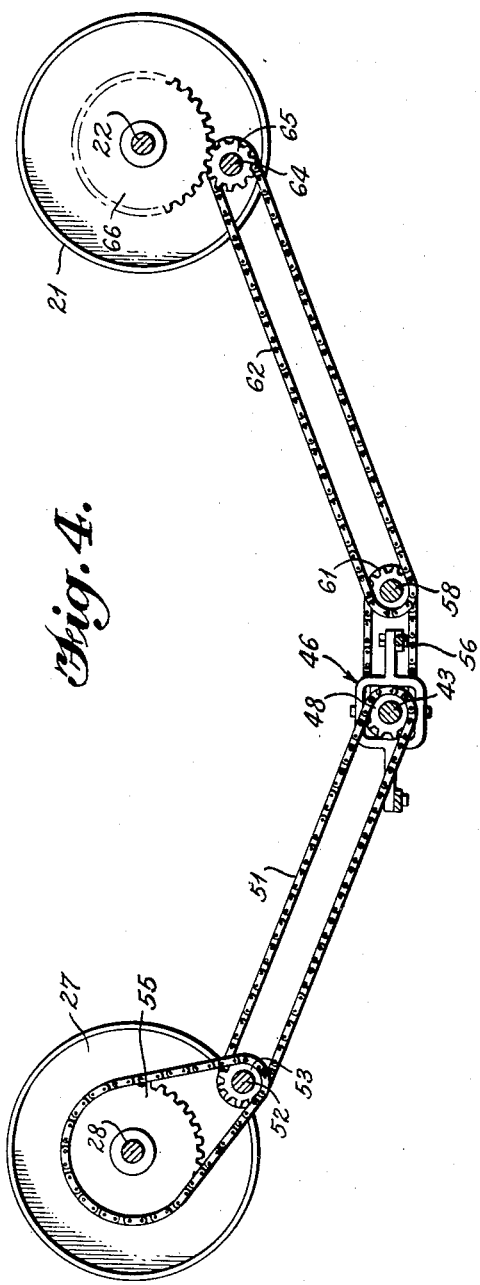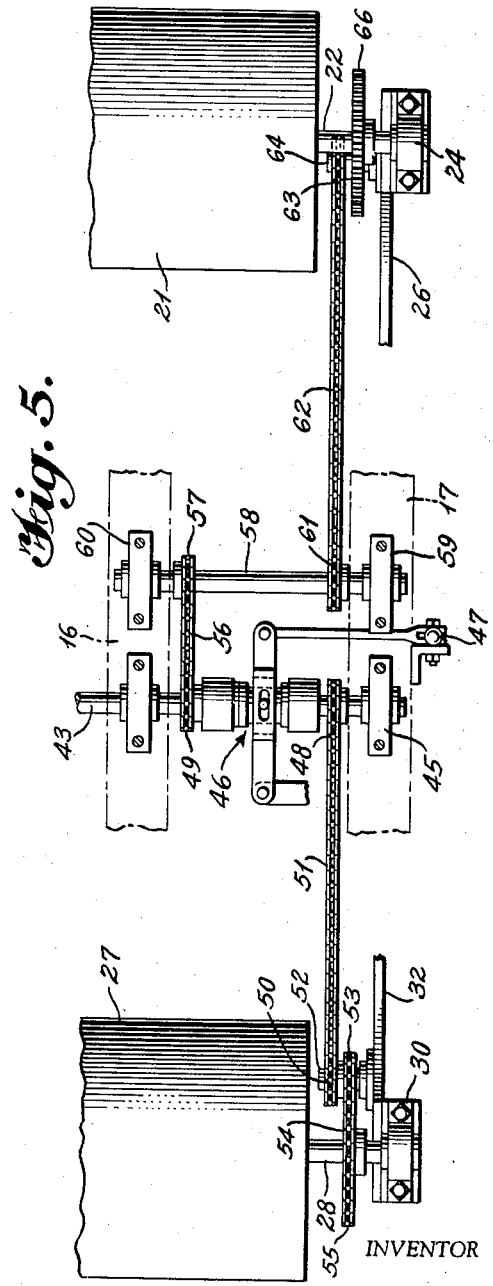

INVENTOR
*Edward Procopio*
BY *Burns, Doane, Benedict & Irons*
ATTORNEYS

United States Patent Office 2,831,526
Patented Apr. 22, 1958

2,831,526

METHOD AND APPARATUS FOR PRODUCING LAMINATED SHEETING FROM A CALENDERED SHEET

Edward Procopio, Warren, R. I., assignor to Rhee Elastic Thread Corporation, Warren, R. I., a corporation of Rhode Island Application January 29, 1957, Serial No. 636,910

8 Claims. (Cl. 154—1.8)

The present invention relates to a method and apparatus for producing laminated sheeting from a calendered sheet.

There are instances in which it is desired to produce rubber or other plastic sheeting of a thickness greater than the thickness which can be produced on a calender. There are other instances in which sheeting of the desired thickness might be produced on a calender but in which the resulting sheeting would not have the necessary quality or strength. In these instances it is customary to calender a sheet of a thickness which is practical for production of a quality product and to then laminate the calendered sheet to form a sheeting consisting of the number of plies required to give the desired thickness. Methods and apparatus have heretofore been known for producing such laminated sheeting but to the best of my knowledge all such methods and apparatus have lacked continuity of operation, have required cutting of the calendered sheet for each lamination and have required the shifting of large and heavy rolls of material. All prior apparatus for this purpose known to me has also been very large and has required considerable plant space.

One of the primary objects of the present invention is to provide a method and apparatus for producing laminated sheeting from a calendered sheet in which the calendered sheet is taken from the calender and laminated into sheeting of the desired number of plies without interrupting operation of the calender, without cutting the calendered sheet between laminations, and without the necessity for shifting heavy rolls of partially laminated sheeting.

Another object of the present invention is to increase the rate of production of laminated sheeting from a calendered sheet, with the consequence that the cost of producing the sheeting is reduced.

Another object of the invention is to provide a method and apparatus capable of producing laminated sheeting of greater length than has heretofore been considered practical.

Still another object of the invention is to provide apparatus for producing laminated sheeting which is compact and which occupies very little floor space.

Briefly, the apparatus of the invention involves a fabric liner of considerable length with its opposite ends wound on drums mounted for rotation on parallel shafts. The drums are alternately driven in opposite directions to wind the liner first on one drum and then on the other. A calendered sheet is superimposed on the liner between the two drums and wound with the liner on the drums. As the direction of movement of the liner reverses, the calendered sheet folds back on itself and in this manner the plies of the laminated sheeting are formed.

The invention can be better understood by reference to the accompanying drawings wherein:

Figure 4 is a view partly in side elevation and partly in vertical cross-section of portions of the drive mechanism for the drums;

Figure 5 is a top plan view of portions of the drive mechanism for the drums;

Figure 1:
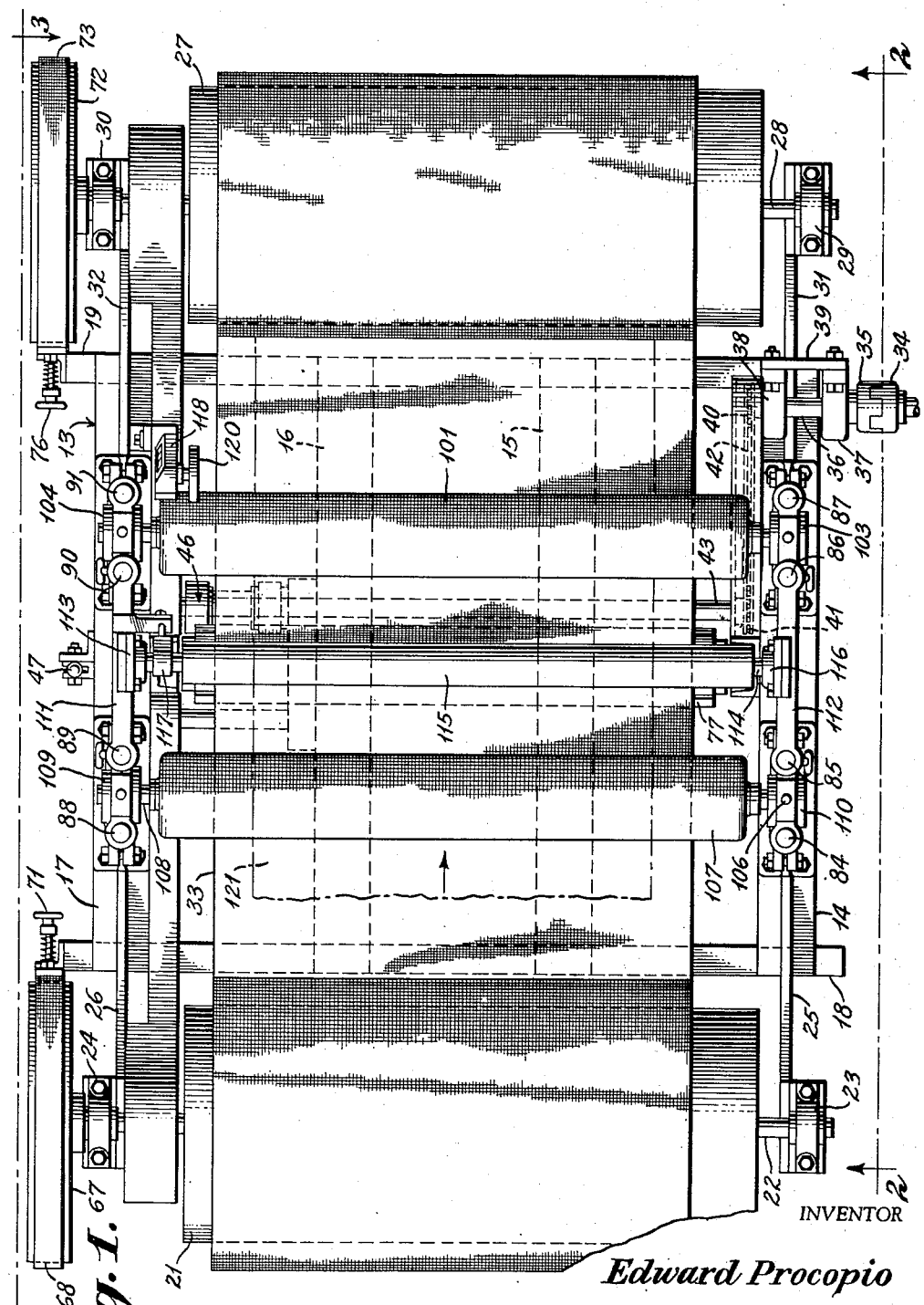
Figure 1 is a top plan view of apparatus embodying the invention.
Figure 2:
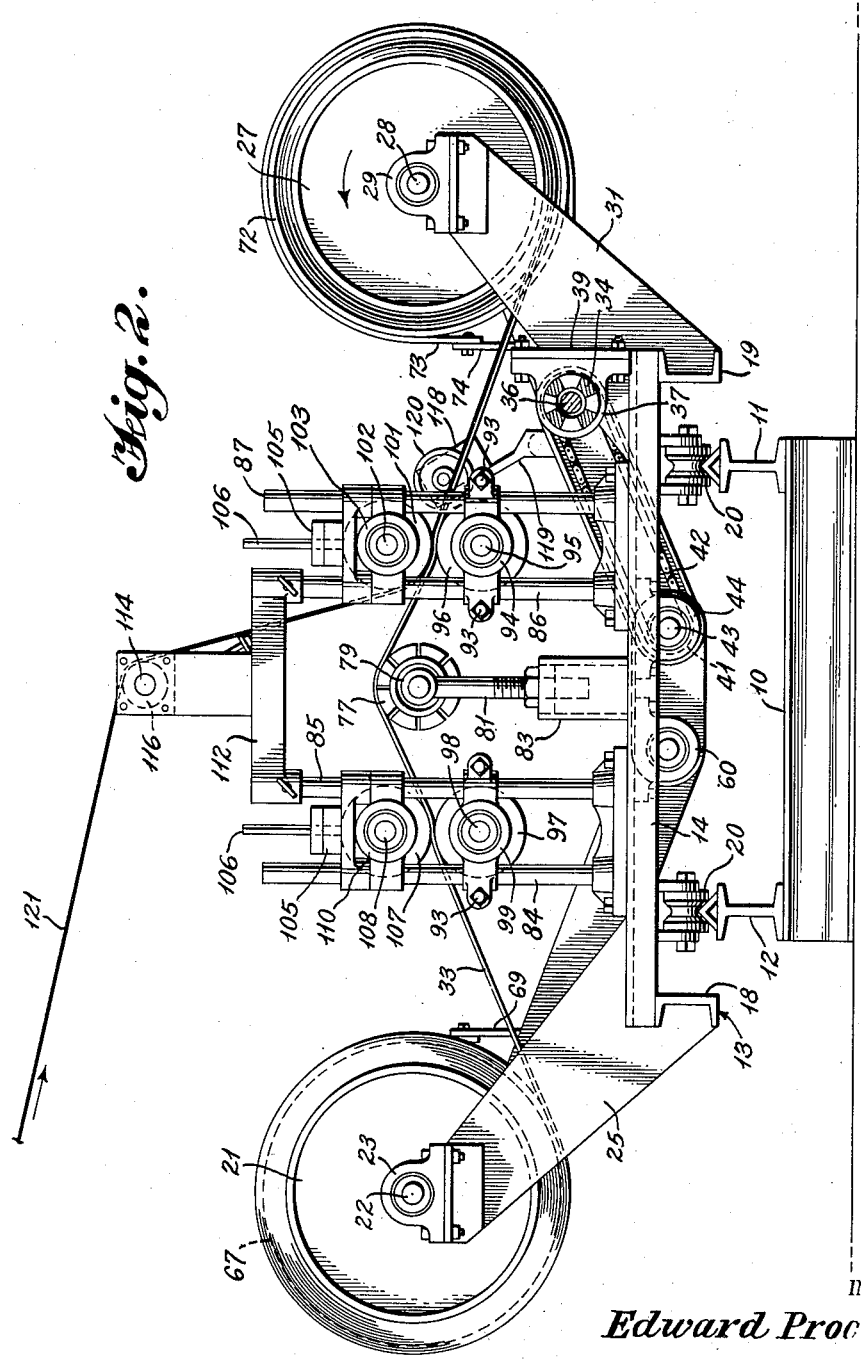
Figure 2 is a side elevational view of the apparatus looking in the direction of the arrows along the line 2—2 of Figure 1.
Figure 3:
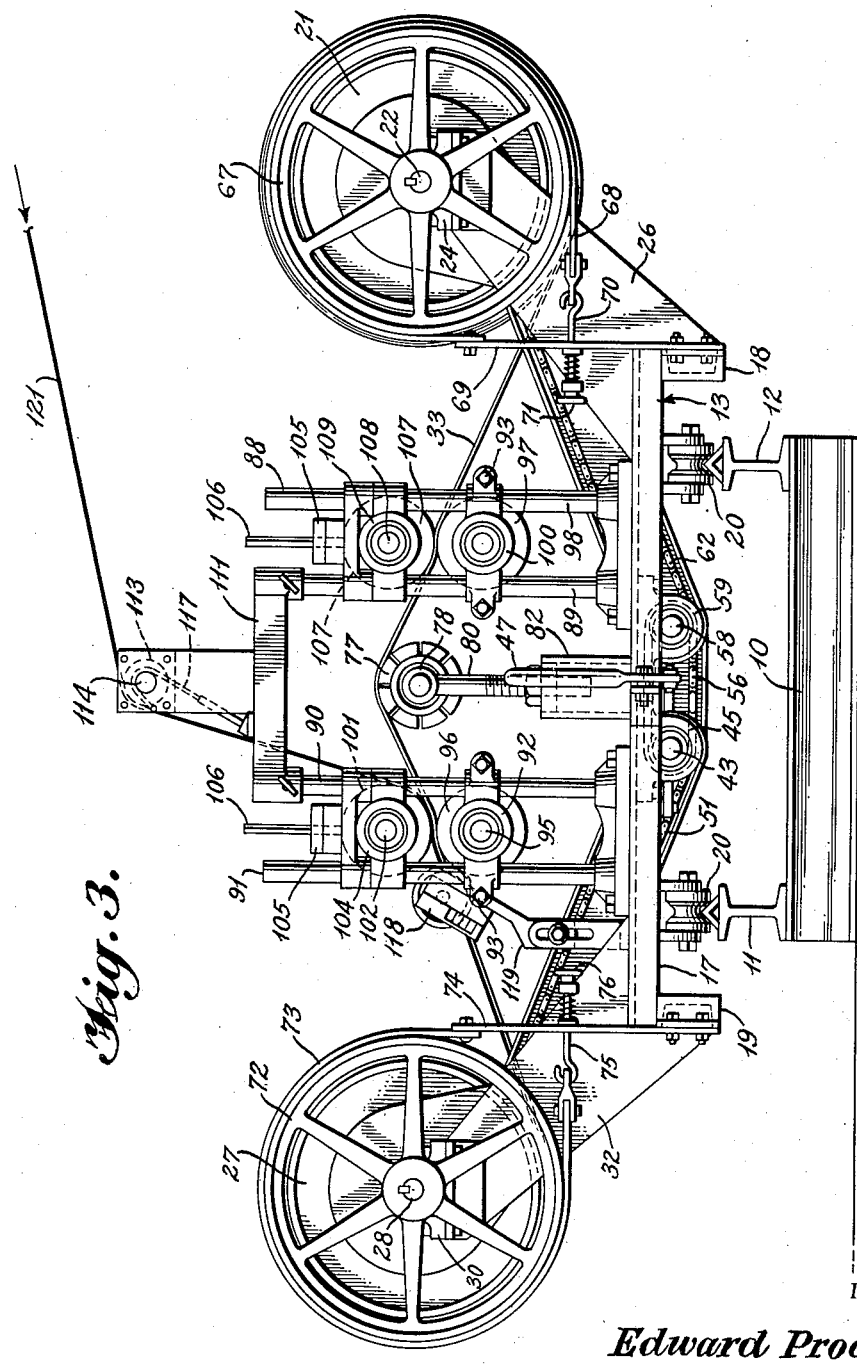
Figure 3 is a side elevational view of the opposite side of the apparatus and taken in the direction of the arrows along the line 3—3 of Figure 1.

A base 10 is permanently fixed to the floor of the plant and supports rails 11 and 12. The frame of the apparatus proper is designated generally by the reference numeral 13 and includes longitudinal frame members 14, 15, 16 and 17 and transverse frame members 18 and 19. Grooved wheels 20 are rotatably mounted near the four corners of the frame 13 to support the apparatus on the rails 11 and 12. It is thus possible to move the apparatus from the rails 11 and 12 onto a mobile truck so that the apparatus can be easily removed from the production line when there is no desire to produce laminated sheeting.

A first drum 21 is fixed on a horizontal axle 22 which is rotatably supported in bearings 23 and 24. The bearings 23 and 24 supported by inclined extensions 25 and 26 secured to the longitudinal frame members 14 and 17, respectively. A similar drum 27 is mounted on a horizontal shaft 28 which is supported in bearings 29 and 30 and which in turn are supported by inclined extensions 31 and 32 secured to the longitudinal frame members 14 and 17, respectively. A fabric liner 33, which is preferably of sailcloth or other good quality of canvas duck, has its opposite ends wound upon the drums 21 and 27. An intermediate portion of the liner 33 extends between the two drums.

Drums 21 and 27 are arranged to be alternately driven by mechanism which will now be described. One element 34 of a toothed coupling is driven by a prime mover (not shown) which is preferably fixed on the plant floor and which is not removed when the laminating apparatus is taken out of the production line as described above. The element 35 of the toothed coupling is secured to a shaft 36 which is rotatably mounted in bearings 37 and 38 carried by an upstanding plate 39 secured to the longitudinal frame member 14. Attached to the inner end of the shaft 36 is a sprocket 40. The sprocket 40 drives a sprocket 41 by means of a drive chain 42. The sprocket 41 is secured to a shaft 43 which extends transversely of the apparatus and which is mounted in bearings 44 and 45 secured beneath the longitudinal frame members 14 and 17, respectively. A double clutch assembly of any suitable conventional type is designated generally by the reference numeral 46 and is provided with clutch control lever 47 pivotally mounted on the side of the longitudinal frame member 17. Since the clutch assembly 46 is a conventional assembly it need not be described in detail except to point out that when the lever 47 is in one position a sprocket 48 will rotate with the shaft 43 and a sprocket 49 will be permitted to rotate independently of the shaft 43. When the lever 47 is moved to a second position the sprocket 49 will be driven with the shaft 43 and the sprocket 48 will be permitted to rotate independently of that shaft. The sprocket 48 drives a sprocket 50 by means of a chain 51. The sprocket 50 is rotatably mounted on a stub shaft 52 fixed to the frame member 32. Fixed to rotate with the sprocket 50 is a sprocket 53 which drives a chain 54, which in turn drives a large sprocket 55 fixed to the shaft 28 of the drum 27. The sprocket 49 drives a chain 56 which drives a sprocket 57 fixed on a countershaft 58. The countershaft 58 is rotatably mounted in bearings 59 and 60 carried by the longitudinal frame members 17 and 16. Also fixed to the shaft 58 is a sprocket 61 which drives a chain 62. A sprocket 63 is rotatably mounted on a stub shaft 64 secured to the frame member 26 and the sprocket 63 is driven by the chain 62. Fixed to rotate with the sprocket 63 is a spur gear 65 which meshes with a larger spur gear 66 secured to the shaft 22 of the drum 21.

It will be seen from the foregoing description of the drive mechanism that when the clutch lever 47 is in one position the drum 27 will be rotated to wind the liner 33 onto that drum. During this operation the liner 33 will be unwound from the drum 21. When the clutch lever 47 is shifted to the second position the drum 21 will be driven in the opposite direction and the liner 33 will be wound on the drum 21. During this latter operation the liner 33 will be unwound from the drum 27.

The drums 21 and 27 are each provided with friction brakes, the purpose of which is to maintain tension in the portion of the liner 33 intermediate the drums. Fixed to the shaft 22 of the drum 21 is a brake wheel 67 which rotates with the drum 21. A brake band 68 extends partially around the circumference of the brake wheel 67. One end of the brake band 68 is secured to the upper end of an upstanding member 69 which is secured to the transverse frame member 18. Secured to the opposite end of the brake band 68 is a threaded hook-bolt 70 which extends through the upstanding member 69. An adjusting nut 71 is threaded on the hook-bolt 70. It will be seen that the braking action on the brake wheel 67 and consequently on the drum 21 can be adjusted by adjustment of the nut 71. The drum 27 is provided with a similar brake assembly consisting of the brake wheel 72, brake band 73, upstanding member 74 secured to transverse frame member 19, hook-bolt 75 and nut 76. It has been found entirely feasible to leave the brakes applied on both drums irrespective of which drum is being driven.

An expander roller 77 is rotably mounted in bearings 78 and 79 carried by posts 80 and 81, respectively, which are mounted in bosses 82 and 83 fixed to the longitudinal frame members 17 and 14, respectively. The purpose of the expander roller 77 is to continuously tend to expand the width of the liner 33 to eliminate any longitudinal wrinkles or creases which might form therein. The expander roller 77 is of any known conventional construction and its details need not be described.

Fixed to the longitudinal frame member 14 are a plurality of vertical posts 84, 85, 86 and 87. Similar vertical posts 88, 89, 90 and 91 are fixed to the longitudinal frame member 17. A bearing member 92 is adjustably secured between the posts 90 and 91 by means of clamping bolts 93. A similar bearing member 94 is adjustably secured between the posts 86 and 87 by similar clamping bolts 93. The shaft 95 of a lower pressure roller 96 is rotatable in the bearings 92 and 94. A second lower pressure roller 97 is provided with a shaft 98. The shaft 98 is mounted in similar vertically adjustable bearings 99 and 100 which are secured between the posts 84 and 85 and the posts 88 and 89, respectively. Clamping bolts 93 are also provided for the bearings 99 and 100.

Positioned above the lower pressure roller 96 is an upper pressure roller 101. The upper pressure roller 101 is provided with a shaft 102 which is rotatably mounted in bearings 103 and 104 which are vertically slidable on the posts 86 and 87 and on the posts 90 and 91, respectively. Weight members 105 are removably positioned on vertical pins 106 carried by the bearings 103 and 104 to urge the upper pressure roller 101 downwardly against the lower pressure roller 96. A second upper pressure roller 107 is provided with a shaft 108 rotatably mounted in a bearing member 109 slidable on the posts 88 and 89 and a bearing member 110 slidable on the posts 84 and 85. The bearing members 109 and 110 are similarly provided with vertical pins 106 on which are removably positioned weight members 105 for urging the upper pressure roller 107 downwardly against the lower pressure roller 97.

A longitudinally extending guide roll support 111 is secured to the upper ends of the posts 89 and 90. A similar guide roll support 112 is secured to the upper ends of the posts 85 and 86. The support 111 is provided with a bearing member 113 which supports one end of a shaft 114 of a guide roller 115. The support 112 is provided with a similar bearing 116 which supports the opposite end of the shaft 114. The shaft 114 is preferably supplied with a small friction brake band 117 which extends partially around the shaft for the purpose of supplying light frictional resistance to rotation of the guide roller 115.

A footage meter 118 is adjustably supported by an arm 119 secured to the longitudinal frame member 17. The footage meter 118 is provided with roller 120 which is shown in engagement with the periphery of the lower pressure roller 96.

The liner 33 extends between the pressure rollers 96 and 101, over the expander roll 77 and between the pressure rolls 97 and 107.

Figure 6:
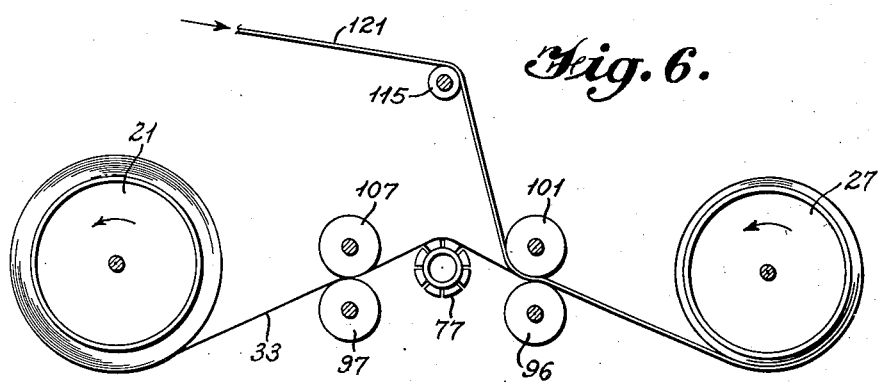
Figure 6 is a diagrammatic side elevational view of portions of the apparatus and illustrating the first ply of a calendered sheet being superimposed on the liner.
Figure 7:
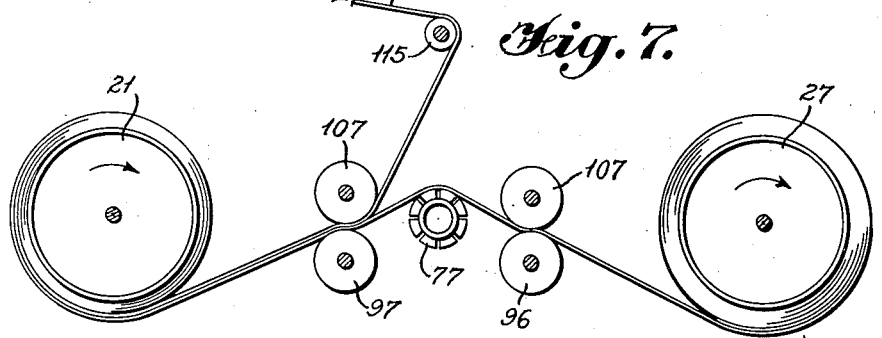
Figure 7 is a view similar to Figure 6 but illustrating the formation of a second ply of the laminated sheeting.
Figure 8:
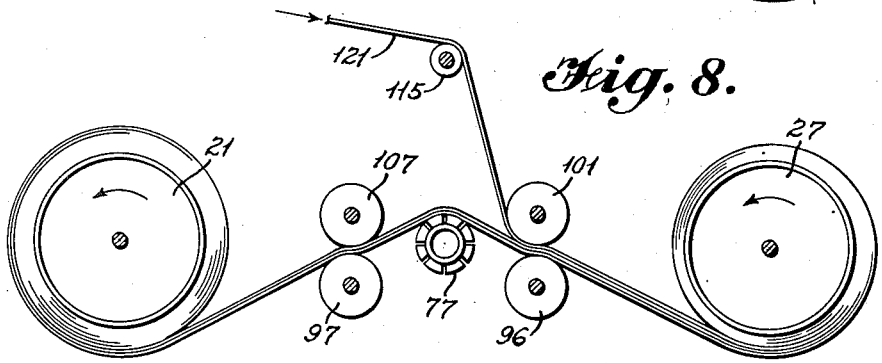
Figure 8 is a view similar to Figures 6 and 7 but illustrating the formation of a third ply of a laminated sheeting.

The operation of the apparatus can now be described. Let it be assumed that the majority of the length of the liner 33 is wound on the drum 21. The clutch control lever 47 is moved to a position to cause the drum 27 to be driven in the direction shown by the arrow in Figure 6. A calendered sheet 121 is fed from the calender over the guide roller 115 and is superimposed on the liner 33 in the nip of the pressure rollers 96 and 101. The calendered sheet 121 may be a single ply or it may be two or more superimposed plies which have been plied in the calender. In any event, the calendered sheet will be wound up with the liner 33 on the drum 27. During this stage of the operation the liner will be unwound from the drum 21 against the action of the friction brake associated with that drum. When the operator ascertains from the footage meter 118 that a length of calendered sheet 121 slightly greater than the desired length of the laminated sheeting has been wound on the drum 27, the clutch control lever 47 is moved to the opposite position to cause the drum 21 to be driven and the drum 27 to be released from driving engagement with the drive mechanism. As soon as the clutch control lever 47 is shifted the liner will reverse direction and the calendered sheet 121 will fold back on itself and the double thickness of the calendered sheet will enter the nip between the pressure rollers 97 and 107. There will then be rolled with the liner 33 on the drum 21 a double thickness of the laminated sheet. This stage of the operation is best illustrated in Figure 7 of the drawings. When the footage meter 118 has returned to approximately its original reading, the clutch control lever 47 is again shifted to again cause the drum 27 to be driven in the direction of arrows shown in Figures 6 and 8. The calendered sheet 121 will again fold back upon itself and the three thicknesses of calendered sheet will enter the nip between the pressure rolls 96 and 101. This stage of the operation is best shown in Figure 8. These operations are continued until the desired number of plies has been produced in the laminated sheeting.

Figure 9:
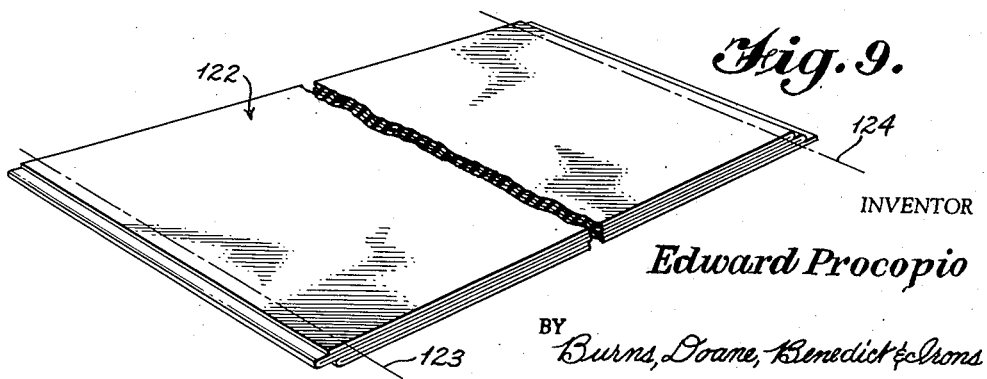
Figure 9 is a perspective view of a five-ply laminated sheeting which has been produced according to the invention.

It is not essential that the reversals of direction of the liner 33 ocur at exactly the same positions. As a matter of fact, some slight deviation in this respect may be preferable in that a laminated sheeting of the form illustrated in Figure 9 is thereby produced. This laminated sheeting is designed generally by the reference numeral 122 and is shown as a five-ply sheeting. It will be seen from inspection of Figure 9 that the fold lines at each end do not exactly coincide. The ends of the laminated sheeting 122 are thus somewhat "feathered" in thickness. The ends of the laminated sheeting are customarily trimmed approximaely along the lines 123 and 124 prior to use.

The completed laminated sheeting can be easily removed from the apparatus. Let it be assumed that the final ply is added as the sheeting is being wound on the drum 21. When the end of the laminated sheeting being unwound from the drum 27 approximately overlies the expander roller 77 the calendered sheet 121 is severed. A slight additional rotation of the drum 21 will cause the end of the laminated sheeting to be drawn between the pressure rollers 97 and 107. The end of the laminated sheeting can then be laid over the top of the drum 21. The drum 27 is then driven in the direction of the arrow in Figure 6 and the laminated sheeting will be unwound from the drum 21 and stripped from the liner 33. The laminated sheeting thus removed can be wound on a roll for curing or shipment.

It will be seen from the foregoing description that the calender supplying the calendered sheet 121 can be operated continuously during the formation of the laminated sheeting 122. The calendered sheet 121 need not be severed until formation of the laminated sheeting 122 has been completed. The drums 21 and 27 are continuously supported in their respective bearings and those drums partake of no movement except rotation. The liner 33 may be as much as three hundred feet or more in length and it is therefore possible to produce laminated sheetings of approximately that length. The diameter of the drums 21 and 27 should be made as large as pracical so that the radii of the convolutions of liner and laminate do not change excessively as the windings build up on the drums.

The upper pressure rollers 101 and 107 are preferably textile-covered to reduce possibility of the laminated sheeting adhering thereto.

I have illustrated and described what I now consider to be the preferred embodiment of the invention. It will be understood that various alterations and modifications may be made without departing from the broader scope of the invention as defined by the following claims.

Having thus described my invention, I claim:

1. Apparatus for producing laminated sheeting comprising a pair of drums rotatably mounted on spaced, parallel, horizontal axes, a liner having one end wound on each drum with an intermediate portion of the liner extending between the drums, drive means for alternately driving said drums in opposite directions to first wind the liner on one drum and then on the other, two pairs of opposed pressure rollers rotatable on horizontal axes parallel to the axes of said drums, one roller of each pair of pressure rollers being positioned below said intermediates portion of said liner and the other roller of each pair being positioned above said intermediate portion of the liner, means yieldably urging the rollers of each pair toward each other, and means for guiding a calendered sheet downwardly toward said liner between said pairs of pressure rollers.

2. Apparatus for producing laminated sheeting comprising a pair of drums rotatably mounted on spaced, parallel, horizontal axes, a liner having one end wound on each drum with an intermediate portion of the liner extending between the drums, drive means for alternately driving said drums in opposite directions to first wind the liner on one drum and then on the other, a pair of rollers rotatable on horizontal axes parallel to the axes of said drums, said rollers being positioned above said intermediate portion of the liner, means urging the rollers downwardly toward said liner, and means for guiding a calendered sheet downwardly toward said liner between said rollers.

3. Apparatus for producing laminated sheeting comprising a pair of drums rotatably mounted on spaced, parallel, horizontal axes, a liner having one end wound on each drum with an intermediate portion of the liner extending between the drums, drive means for alternately driving said drums in opposite directions to first wind the liner on one drum and then on the other, brake means opposing rotation of said drums to maintain tension in the intermediate portion of said liners, two pairs of opposed pressure rollers rotatable on horizontal axes parallel to the axes of said drums, one roller of each pair of pressure rollers being positioned below said intermediate portion of said liner and the other roller of each pair being positioned above said intermediate portion of the liner, means urging the rollers of each pair toward each other, and means for guiding a calendered sheet downwardly toward said liner between said pairs of pressure rollers.

4. Apparatus for producing laminated sheeting comprising a pair of drums rotatably mounted on spaced, parallel axes, a liner having one end wound on each drum with an intermediate portion of the liner extending between the drums, drive means for alternately driving said drums in opposite directions to first wind the liner on one drum and then on the other, two pairs of opposed pressure rollers rotatable on spaced axes parallel to the axes of said drums, the rollers of each pair of pressure rollers being positioned on opposite surfaces of said intermediate portion of said liner, means urging the rollers of each pair toward each other, and means for guiding a calendered sheet toward said liner between said pairs of pressure rollers.

5. Apparatus for producing laminated sheeting from calendered sheets comprising a pair of drums rotatably mounted on spaced, parallel axes, a liner having one end wound on each drum with an intermediate portion of the liner extending between the drums, brake means opposing rotation of said drums, drive means for alternately driving said drums in opposite directions to first wind the liner on one drum and then on the other, and means for guiding a calendered sheet toward said intermediate portion of said liner to be wound with said liner on said drums on each reversal of direction of the liner.

6. Apparatus for laminating a calendered sheet comprising a pair of drums mounted for rotation about spaced, horizontal axes, drive means for alternately driving said drums in opposite directions, a liner having its ends wound on said drums with an intermediate portion of the liner extending between said drums, and means for guiding a calendered sheet onto the upper surface of said intermediate portion of said liner whereby the calendered sheet will fold back upon itself upon each reversal of direction of said liner.

7. A process for producing laminated sheeting from a calendered sheet comprising placing an end of the calendered sheet on the surface of a liner, rolling the liner and the superimposed sheet into a first roll, folding said calendered sheet back upon itself, unrolling said first roll while simultaneously rolling the liner and the two superimposed plies of said calendered sheet into a second roll, folding the calendered sheet back upon said two superimposed plies, and unrolling said second roll while simultaneously rolling the liner and the three superimposed plies into a roll.

8. A process for laminating a calendered sheet comprising alternately rolling a liner into first and second rolls with one of the rolls being unrolled while the other is being rolled to thereby cause the liner to travel alternately in opposite directions, rolling a calendered sheet with said liner in said rolls, folding said calendered sheet on itself upon each reversal of direction of said liner, and continuing said steps until a laminate of the desired number of plies is produced.

References Cited in the file of this patent

UNITED STATES PATENTS

| | | |
|---|---|---|
| 1,086,967 | Wiemann | Feb. 10, 1914 |
| 2,354,120 | Haren | July 18, 1944 |
| 2,481,992 | Fisher | Sept. 13, 1949 |
| 2,619,444 | Grantham | Nov. 25, 1952 |